Figure 3:
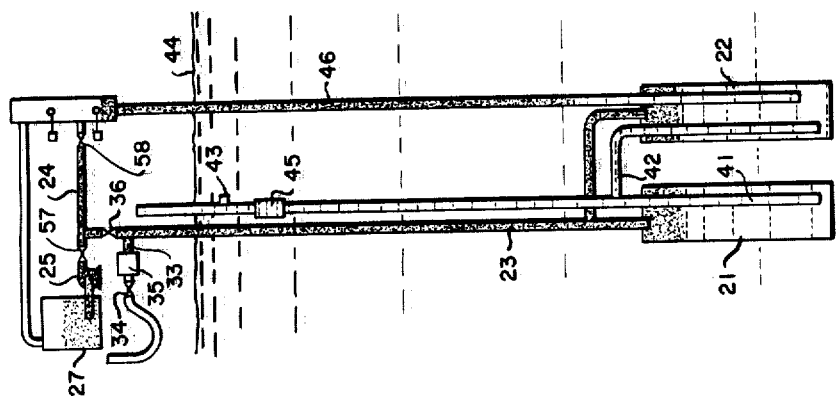
Figure 2:
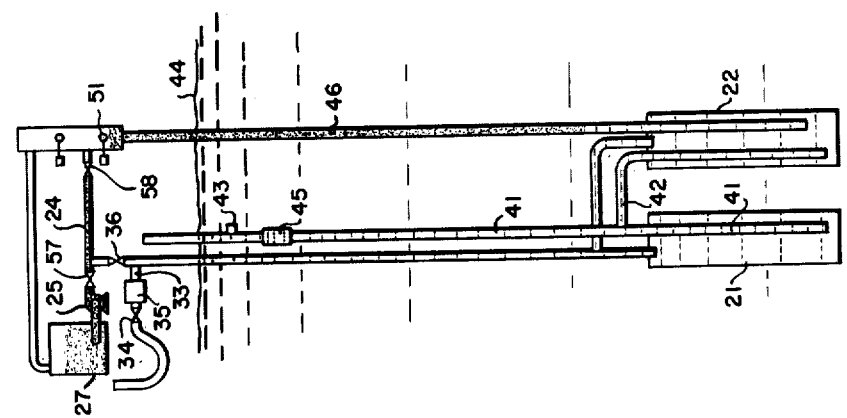

June 15, 1965  D. C. MEYERS  3,189,224
SUBMERGED OIL STORAGE SYSTEM
Filed Dec. 19, 1963  2 Sheets-Sheet 1

INVENTOR:
DOUGLAS C. MEYERS
BY: *A. H. McCarthy*
HIS AGENT

June 15, 1965  D. C. MEYERS  3,189,224
SUBMERGED OIL STORAGE SYSTEM
Filed Dec. 19, 1963  2 Sheets-Sheet 2
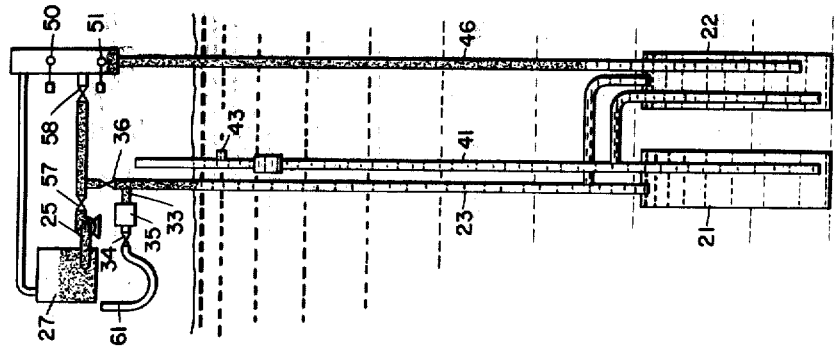
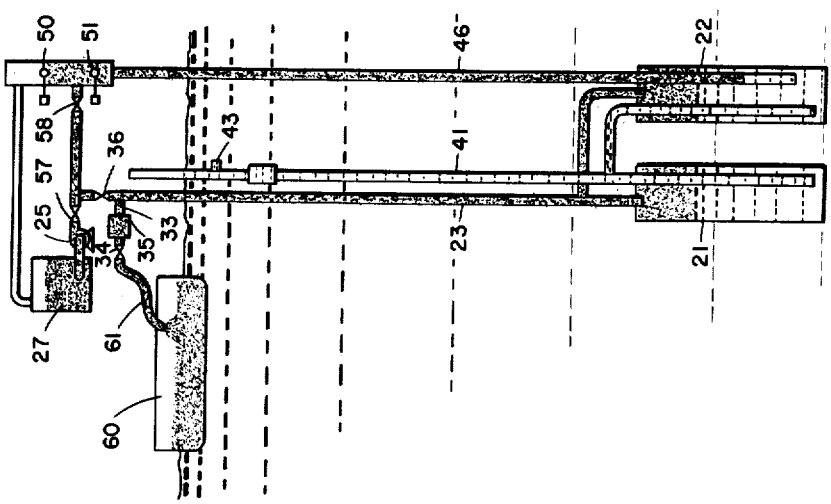
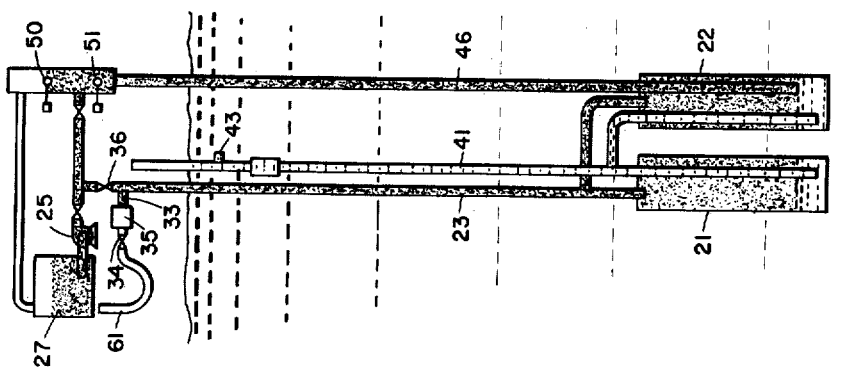
INVENTOR:
DOUGLAS C. MEYERS;
BY: 
HIS AGENT

United States Patent Office 3,189,224
Patented June 15, 1965

3,189,224
SUBMERGED OIL STORAGE SYSTEM
Douglas C. Meyers, Connersville, Ind., assignor to Shell Oil Company, New York, N.Y., a corporation of Delaware
Filed Dec. 19, 1963, Ser. No. 331,667
11 Claims. (Cl. 222—23)

This invention relates to an offshore structure and pertains more particularly to a deep water structure provided with submerged oil storage tanks into which oil from underwater wells can be produced and from which the oil can be subsequently transferred to a tanker at the surface of the body of water.

Heretofore many submerged oil storage systems have been designed for automatically receiving oil into an underwater tank for temporary storage. There are two main drawbacks with most of the presently known submerged oil storage systems. Some have a tendency to overflow and hence contaminate the surrounding water with oil which is hazardous to the structure of shipping within the area and is deadly to fish in the water. Additionally, most systems are provided with automatically-operated valves positioned in lines underwater which are subject to failure as is the case of most valves. Upon failure of the valves or the controls thereof, such for example as the valve operators, the repair of the valves necessitates the storage system being raised to the surface of the body of water or being repaired by divers underwater.

It is therefore a primary object of the present invention to provide an offshore structure including a submerged oil storage system wherein all of the control apparatus of the oil system is positioned above the surface of the water.

A further object of the present invention is to provide an offshore structure having submerged oil storage tanks with a control system for filling and/or emptying the tanks in a manner such that the tanks are never over-pressured and subject to rupturing forces.

Still another object of the present invention is to provide an offshore structure having a submerged oil storage system in which it is possible to determine at all times when the tanks are full and thus prevent flowing any of the oil into the ocean.

Figure 1:
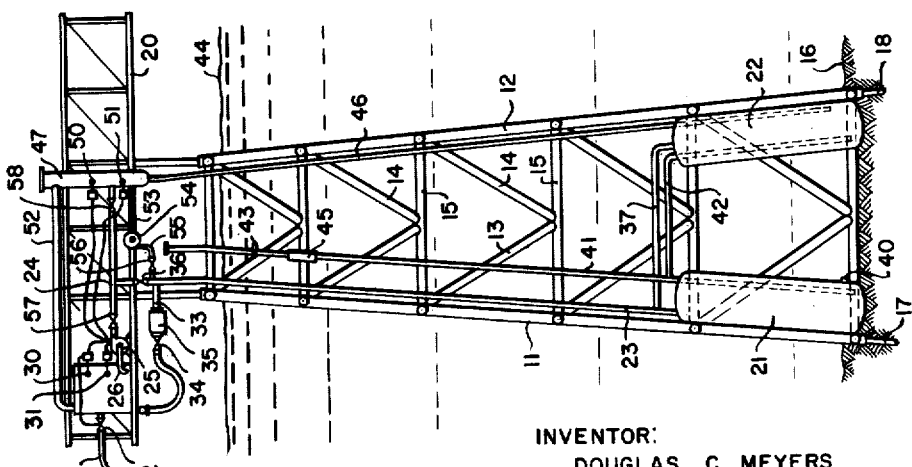

These and other objects of this invention will be understood from the following description taken with reference to the drawing, wherein:

FIGURE 1 is a diagrammatic view taken in longitudinal projection illustrating the offshore structure of the present invention together with a schematic arrangement of the submerged oil storage system mounted on the structure;

FIGURES 2 through 6 are schematic flow diagrams of the submerged oil storage system of the offshore structure of FIGURE 1 illustrating the sequential steps of initially filling the control column of the structure, subsequently filling the underwater storage tanks with oil, automatically shutting down the storage system when the tanks are full, and emptying the tanks to an oil barge until the cycle has been completed and the oil storage system tanks are again in a condition to receive additional quantities of oil for storage.

Referring to FIGURE 1 of the drawing, an offshore structure is illustrated as having a plurality of upwardly-extending legs 11 and 12, there being at least three legs arranged in a configuration of closed periphery and being secured together by cross-bracing elements 13, 14 and 15. The offshore structure is shown as being fixedly secured to the ocean floor 16 by piles 17 and 18 being driven down through legs 11 and 12 for a distance sufficient to prevent the structure from tipping over.

Mounted on the top of the offshore structure is a platform 20 on which suitable control equipment for the present oil storage system may be located. Positioned underwater and fixedly secured to the legs 11 and 12 of the structure, preferably near the lower end thereof, are one or more storage tanks 21 and 22. For purposes of illustration, a two-tank storage system is illustrated although it is to be understood that any number of tanks can be interconnected together and controlled by the same control equipment on the platform 20. Additionally, while a single control system is illustrated as controlling a pair of tanks on an offshore structure, the storage system of the present invention has more flexibility if at least a pair of control systems are provided on the platform 20 for controlling separate tanks or separate sets of storage tanks positioned underwater. Thus, on a four-legged offshore structure, it is preferred to employ a storage tank secured to the lower end of each leg with two control systems on the platform 20 for controlling the storage tanks in pairs. Thus, oil could be continuously received from wells into some tanks while at the same time oil in other tanks was being discharged to a tanker which would be used to transport oil from the offshore structure to a refinery.

An oil conduit 23 is in communication with the upper end of the storage tank 21 and extends upwardly to the platform 20 where it is in communication with the discharge line 24 of the pump 25. The intake 26 of the pump is preferably connected to a surge tank 27 although, altenatively, it may be connected directly to one or more oil producing wells offshore. Preferably, however, the surge tank 27 is filled through a line 28 which in turn is in communication with one or more producing underwater wells or with an underwater oil-handling facility. The surge tank is illustrated as being provided with upper and lower liquid level controllers and indicators 30 and 31, respectively, which may be operatively connected to start and stop the pump 25. Alternatively, the liquid level controllers and indicators 30 and 31 may be operatively connected to a valve 32 in the oil line 28 from the wells to control the flow of oil through the lines, as desired. It is to be understood that the valves employed in the control system of the present invention are preferably of the remotely-actuatable type and may either be electrically, pneumatically or hydraulically operated in a manner well known to the art.

The oil conduit 23 is also provided at a point above the water with a discharge line 33 having a normally closed valve 34 therein and preferably being provided with a flow meter 35. The oil conduit 23 is provided with a closure valve 36 which is closed when a delivery of oil is being made from the tank 21 and/or 22. In the event that the tanks 21 and 22 are to be filled and emptied simultaneously, the oil conduit 23 is also in communication with the upper portion of tank 22 through an extension oil conduit 37.

Additionally, the storage tanks 21 and 22 are provided with inlet and outlet ports or conduits whereby sea water may enter the tanks below any oil therein or be discharged from the tank. For example, each of the tanks, such as tank 21, may be provided with an open port 40 at the lower end thereof in communication at all times with the sea water. Preferably, however, the water inlet and outlet means to the tanks 21 and 22 consist of an upwardly-extending conduit 41 which is in communication at a lower end with the lower end of the tank 21 and is also in communication with the lower end of tank 22 through water extension conduit 42. An opening 43 is provided in the water conduit 41 at some point below the surface of the water 44. The opening 43 in the water conduit 41 is preferably provided near the upper end of the conduit 41 so that a filter 45 may be positioned in the water conduit 41 relatively near the surface 44 of the body of water so that the filter, which is employed to keep foreign matter out of the storage tanks 21 and 22, may be readily changed in a manner well known to the art by sending a fishing tool down the water conduit 41 from the upper end thereof.

At the same time, at least one of the storage tanks 21 or 22 is provided with a control column 46 which takes the form of an upwardly-extending pipe in communication with the interior of one of the connected storage tanks 21 and 22 at a point near the lower end thereof yet at least slightly above the lower end of the water conduits 40, 41 and/or 42. The upper end of the control column 46 at the level of the platform 20 is preferably enlarged in diameter, as at 47, so as to allow at least one and preferably a pair of liquid-level controllers and indicators 50 and 51 to be mounted therein. The enlarged diameter section 47 of the control column 46 permits more accurate control for the floats of the liquid-level controllers and indicators 50 and 51 and prevents large level variations in the control column due to changes in water level from waves, etc. The upper liquid-level controller 50 is operatively connected to the pump 25 so as to shut off the pump 25 when the level of the fluid in the control column reaches the controller 50. In the event that the controller 50 fails to work, fluid will pass out the top of the oil column and through an overflow line 52 which is provided to circulate the oil back to the surge tank 27 where the level in the tank could build up until it reaches liquid-level controller 30 which would shut off the pump 25 and/or the oil inlet valve 32.

In order to lower the level of the oil in the large-diameter section 47 of the control column 46, any of various suitable arrangements may be employed. For example, a drain line 53 from the control column 46 forms the intake line for an auxiliary pump 54 whereby sufficient oil may be discharged through line 55 and check valve or normally-closed valve 56 to lower the level of the fluid within the control column 46 to the liquid-level controller 51.

Liquid level controller 51 serves to control the level to which the oil in column 46 should be lowered before start of each filling cycle (which must be low enough below controller float 51 so that level in column 46 will not reach float 51 due to action of waves or swells). Float 51 should be at or above drain-fill line 24.

Thus it will be seen that the offshore structure has been provided with a submerged oil storage system having an inlet and outlet oil conduit 23, and inlet and outlet water conduit 41, and a control column 46 which provides a surface indication when the tanks are full.

It is to be noted that the oil storage tanks 21 and 22 positioned at the lower end of the offshore structure, form buoyancy tanks when empty, thus helping to support the structure as it is towed into place prior to positioning it from the ocean floor. Thus, the offshore structure of the present invention could be towed to a selected offshore position by either securing the upper end of the structure to a barge or attaching a temporary flotation tank thereto so that the entire structure could be floated and towed into position. When in position, the structure would be up-ended with the storage tanks 21 and 22 being flooded with water in a manner well known to the art so as to sink the structure to the ocean floor in a vertical position. Piles 17 and 18 would then be driven down through legs 11 and 12 to anchor the structure securely to the ocean floor. Subsequently, the platform 20 and its associated equipment would be secured to the upper end of the structure. Valves 57 and 58 are provided in the discharge line 24 from the pump 25 for shutting off portions of the line 24 as desired. Valve 57 is normally opened at all times.

Preferably, but not necessarily, the control column 46 is originally filled with oil to the level of the lower liquid level controller 51 by opening valve 57 and 58 and pumping oil from the surge tank 27, through line 24, into the top of the control column 46 so as to displace the water therein out the bottom of line 46, and up one of the conduits 42 and 41 to be discharged to the sea through opening 43. The level of the oil/water interface in the control column is immaterial and will vary as the gravity of the oil varies. With the control column 46 partially filled with oil as shown in FIGURE 3, the filling of the storage tanks 21 and 22 is started by closing valves 58 and valve 34 and pumping oil under pressure by means of pump 25 from the surge tank 27 down the oil conduit 23. Oil starts to fill the tanks 21 and 22 from the top thereof, displacing the water downwardly and up the water conduits 42 and 41 to be discharged through water outlet 43. This discharge action also tends to clean material from the filter 45 in the water line 41.

The submerged oil storage system of the present invention is shown in FIGURE 4 at a time when the storage tanks 21 and 22 are filled with oil and a certain amount of oil has passed down around the lower end of the control column 46 so as to put more oil in the control column to the upper liquid-level float control 50 which in turn shuts off the pump 25 and/or the inlet valve 32 (FIGURE 1) to the surge tank 27. Alternatively, this upper liquid-level flow control at 50 could be employed to switch the incoming oil from the wells to another oil storage system in a manner well known to the art.

In FIGURE 5, a vessel such as a tanker 60 is diagrammatically represented as having been positioned adjacent the offshore structure of the present invention and is being filled with oil being discharged upwardly through oil conduit 23, discharge line 33, flow meter 35, open valve 34 and flexible discharge line 61. At this time the oil in the storage tanks 21 and 22 is under a hydrostatic head of water sufficient to automatically force the oil out of the storage system as soon as the valve 34 is opened. At this time water would enter the opening 43 in the water conduit 41 so that water would enter the lower end of the storage tanks 21 and 22 and, displace the oil therefrom. After the tanks were emptied, valve 34 would be closed. However, before starting another cycle of filling the storage tanks 21 and 22, it would be necessary to start the pump 25 and this could not be done until the liquid level in the control column 46 was lowered below the upper liquid level controller 50, and preferably down to the lower liquid controller 51. This could be done in a manner previously with regard to FIGURE 1 wherein an auxiliary pump 54 was employed to pump the oil back into the oil conduit 23 or into the surge tank 27. Alternatively, in the event that the liquid level controllers 59 and 51 were positioned at a level above the line 24, fluid could be drained by gravity from the control column 46 through open valves 58 and 36 into the upper end of the oil column 23 when valve 57 is closed. Thus, with the system in a condition illustrated in FIGURE 6, valve 57 could be opened and valve 58 closed and the pump 25 again started automatically or by a timing arrangement to again fill the storage tanks 21 and 22.

If desired, suitable means may be provided to periodically purge any high cut emulsion which accumulates in control column 46 since any emulsion entering column 46 would be trapped and would accumulate until the sea level head was insufficient to raise the level in the control column to the required height to activate float 51. Any emulsion produced would occur at the oil-water interface and would enter control column 46 as soon as this interface reached the lower level of column 46. A pipe may be run inside of column 46 to permit injecting gas to gas lift out the emulsion trapped after each filling cycle and permit recharging column 46 with a clear supply of oil. Gas pipe need only be run to just below sea level since as oil and emulsion are lifted out, sea water will rise in column 46 until heads are equalized.

I claim as my invention:

1. A submerged oil storage and delivery system for an offshore installation, said system comprising an offshore structure having at least the lower portion thereof submerged beneath the surface of a body of water, an oil storage tank secured to said structure underwater, oil conduit means in communication between said underwater storage tank near the upper end thereof and a point above said body of water, water outlet means through the wall of said storage tank in open communication at all times with said body of water, a control column carried by said structure in communication between the space above the body of water and the interior of said storage tank above the water outlet means thereof, means in said oil conduit means for controlling the supply of oil therethrough under a pressure sufficient to deliver it to said storage tank, an oil discharge line from said oil conduit means at a point above said body of water, and normally-closed valve means in said discharge line.

2. The apparatus of claim 1 wherein said means in said oil conduit means for controlling the supply of oil therethrough comprises pump means.

3. The apparatus of claim 1 wherein said means in said oil conduit means for controlling the supply of oil therethrough comprises remotely actuatable valve means.

4. The apparatus of claim 1 wherein said control column includes liquid level indicating means operatively connected to said means in said oil conduit for controlling the supply of oil therethrough.

5. The apparatus of claim 2 including a surge tank mounted on said offshore structure above the water surface, said surge tank having oil inlet line means adapted to be connected to at least one producing oil well, said surge tank having oil outlet means in communication with the intake of said pump means, and liquid level indicating means in the upper end of said control column operatively connected to said pump means.

6. The apparatus of claim 5 including a pipe vertically-extending from and in communication with said water outlet means of said storage tanks, the upper end of said pipe extending above the surface of the water and having port means through the wall thereof at a point below the water surface.

7. The apparatus of claim 6 including filter means positioned in said pipe between the port means and lower end thereof.

8. The apparatus of claim 5 including conduit means in communication with the discharge of said pump means and with the interior of said control column for filling said control column with oil, and valve means in said conduit means for normally closing said conduit means.

9. The apparatus of claim 5 including a valved discharge line in communication with the interior of said control column below the liquid level indicating means thereof.

10. The apparatus of claim 9 including an auxiliary pump in said valved discharge line.

11. The apparatus of claim 5 including valve means in said oil inlet line means and liquid level control means in said surge tank operatively connected to said valve means.

References Cited by the Examiner

UNITED STATES PATENTS

| | | | |
|---|---|---|---|
| 2,579,005 | 12/51 | Lambert | 137—236 X |
| 2,594,105 | 4/52 | Watts | 222—395 X |
| 2,731,168 | 1/56 | Watts | 137—236 X |
| 2,747,774 | 5/56 | Breitenbach | 222—395 |
| 3,113,699 | 12/63 | Crawford et al. | 222—23 |

LOUIS J. DEMBO, *Primary Examiner.*